Patented Jan. 14, 1930

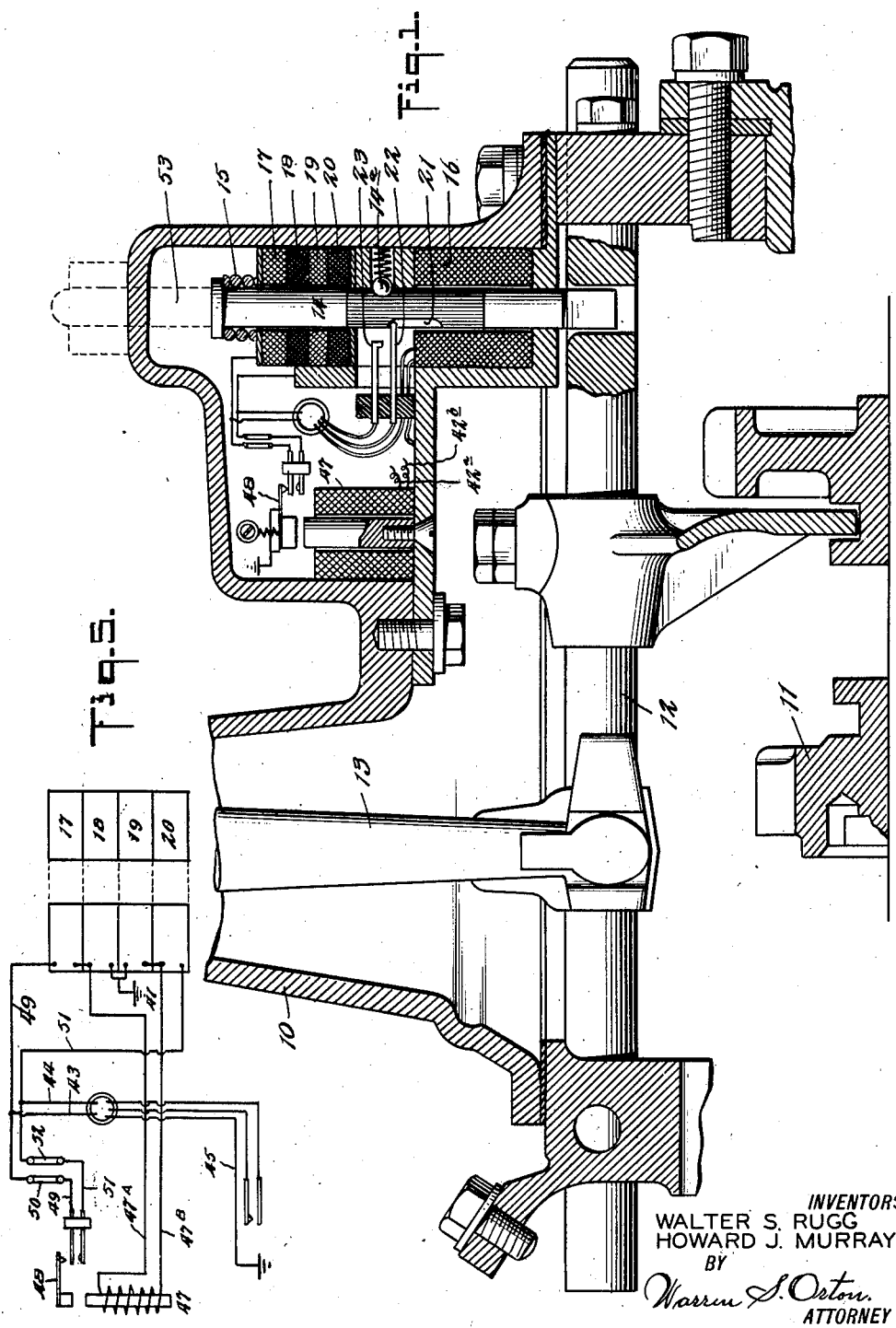

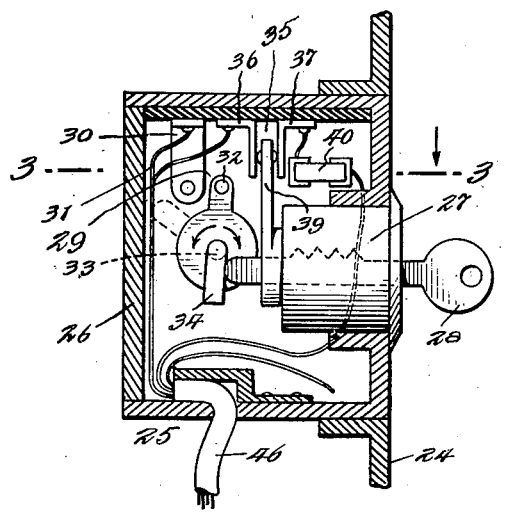

1,743,730

UNITED STATES PATENT OFFICE

WALTER S. RUGG, OF PITTSBURGH, PENNSYLVANIA, AND HOWARD J. MURRAY, OF BROOKLYN, NEW YORK, ASSIGNORS TO R. M. COMPANY, INC., OF EAST PITTSBURGH, PENNSYLVANIA, A CORPORATION OF DELAWARE

BRIDGE-CONTROLLED TRANSMISSION LOCK

Application filed November 15, 1926. Serial No. 148,603.

The invention relates in general to a remotely controlled lock and specifically relates to control means for retarding unauthorized operation of a motor vehicle by means of a remotely controlled lock. More specifically defined, the invention relates to a control for a transmission lock, or/and, for the ignition circuit of the vehicle provided conventionally with a transmission lock and means forming an ignition circuit.

Automotive vehicles are at present provided with different forms of transmissions locks usually disposed to extend through the floor board of the vehicle and usually located in such way that they are difficult of access. It has become quite a usual practice of a vehicle driver to turn off the ignition with the usual ignition key or lever at an accessible position on the instrument board without bothering to lock the transmission. Operators frequently leave the transmission and ignition controlling keys in position when they leave the vehicle, being interested only in seeing that the engine is stopped and as a result a large number of cars are stolen.

The primary object of the invention is to provide a simple form of theft retardance system for use in an automotive vehicle by means of which the driver when he desires to stop the engine will be compelled to set the protective system automatically into operative position as an incident of shutting off the ignition.

Broadly, this phase of the invention is attained by interconnecting an ignition circuit controlling switch with the transmission lock so that in the single act of shutting off the ignition to stop the engine, the transmission is automatically locked and remains locked until the ignition circuit is restored to operative position as an instance of the operator manipulating the proper transmission unlocking mechanism.

An incidental object of the invention is to provide a control for the transmission lock and/or the ignition controlling circuit, which control will be disposed on the instrument board or other position convenient to the operator, and preferably controlled by key, a combination lock, or by equivalent instrumentality, under the sole control of the operator provided with the proper key.

In the embodiment of the invention where the control of the transmission and ignition circuit is key controlled, there is featured a structure in which the key must be removed in order to lock or unlock both the transmission and the ignition.

Another object of the invention is to provide protective means operatively associated with the transmission lock and ignition circuit which, when once set, will tend to render it impossible for an unauthorized person to unlock the transmission or close the ignition circuit, and this aspect of the present disclosure constitutes another embodiment of the invention disclosed in the application of Howard J. Murray, Theft protection system, Serial No. 522,631 filed December 15, 1921.

In the instant case, the invention is characterized by the employment of a normally balanced Wheatstone bridge with the resistances forming one or more of the legs split and separately housed and protected and with its galvanometer circuit tending when energized to short circuit the means which act normally to unlock the transmission and close the ignition circuit.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a vertical sectional view taken through a conventional form of part of an automotive vehicle transmission and showing a preferred embodiment of a portion of the invention installed therein;

Fig. 2 is a vertical sectional view of a control station cooperating with the disclosure in Fig. 1 to complete an embodiment of the invention;

Fig. 3 is a transverse sectional view taken on the line 3—3 of Fig. 2 looking downwardly as indicated by the arrow;

Fig. 4 is a diagrammatic view showing the several electric circuits present in the preceding figures; and Fig. 5 is a schematic view of the electrical parts shown in Fig. 4 with their electrical connections.

Referring to Fig. 1 there is disclosed part of a conventional form of transmission casing 10 containing the usual multispeed gears 11, controlling shift rods of which one is shown at 12, and a hand shifting lever 13, all collectively referred to hereinafter as a transmission. Still following somewhat conventional practices, there is disclosed a transmission lock including a plunger 14 designed to be depressed against the action of a lifting spring 15. The lower end of the plunger 14 is designed conventionally to engage the shift rods and lock the transmission in neutral position as is well known at present.

The lower portion of the plunger 14 is surrounded by an electromagnet 16 operatively disposed so that when energized it will lower the plunger from its normal, inoperative, unlocking position into its downwardly projected, operative locking position shown in Fig. 1. A spring depressed detent 14ª engages in a semi-spherical recess in the side of the plunger when in transmission locking position to hold the plunger against accidental unlocking and to resist the upward unlocking movement of the plunger until it is powerfully moved by the cooperative action of the four withdrawing electromagnets assisted by the spring 15.

The upper portion of the plunger 14 is surrounded by an unlocking electromagnet which may be of single form as shown in connection with the locking magnet 16, but in the instant case is made up of four superposed annular electromagnets numbered from top to bottom of the showing in Figs. 1 and 5 as 17, 18, 19 and 20. As thus far described, it can be assumed that the locking and unlocking of the transmission may be attained by the closing of a circuit through the electromagnet 16 for locking the transmission and the closing of the circuit through the unlocking electromagnet or electromagnets 17—20 to unlock the transmission which latter movement is assisted by the spring 15 so that the unlocking electromagnet or electromagnets need not be as strong in plunger actuating power as the locking electromagnet 16.

The plunger 14 is provided on one side thereof with a slot 21 elongated in the direction of movement of the plunger and projecting laterally into this slot is the movable element 22, which together with its relatively fixed coacting element 23 constitutes a circuit closer for controlling the ignition circuit of the vehicle.

From this disclosure it will be understood that the plunger 14, independently of its action as a transmission lock, constitutes an electro-magnetically actuated means for selectively opening or closing the ignition circuit at will from a point remote from the ignition controlling circuit closer and therefore the switch 22—23 in effect takes the place of the usual ignition switch except that it is housed and protected by the massive transmission casing 10.

Mounted on the instrument board 24 or at any other point convenient to the operator of the vehicle is a control station 25, the mechanism of which is protected within a casing or housing 26 designed and formed of material to make it burglar resistant. The casing is provided on its front side with a key controlled lock 27 of the conventional tumbler type now in general use in devices of this character. The lock is designed to have two positions, an unlocked and a locked position, in both of which the key 28 may be withdrawn as is usual.

There is provided a transmission locking and ignition opening circuit which includes the electromagnet 16 and a normally open circuit closer 29 contained in the casing 26. This circuit closer includes a fixed contact 30 connected by means of a lead 31 to one side of a grounded battery B or other suitable form of electric energy. The movable element 32 of this circuit closer is rotatably mounted on a shaft 33 and is normally held by means of spring 33' in an inoperative circuit breaking position as indicated by dotted lines in Fig. 2. The shaft is provided with a cam 34 disposed in the path of movement of the key 28 as it is inserted into the lock 27 for the purpose of locking or unlocking the same. The parts are so disposed that when the key is in position in the lock as indicated in Fig. 2 it will bear on the cam 34 and shift the movable contact 32 from the dotted line position passed the circuit closing position momentarily engaging the contact 30 and finally again into a circuit opening position shown in full lines in Fig. 2. It will be understood that as long as the key is in position in the lock, the circuit will be broken to the locking electromagnet 16 and that every time the key is inserted into the lock or removed from the lock current will momentarily pass through the locking electromagnet to cause the same to react on the locking plunger and move the same into position to lock the transmission and incidentally open the ignition circuit.

The unlocking electromagnet or electromagnets 17—20 are contained in a circuit which includes an unlocking circuit closer 35. This unlocking circuit closer includes a pair of fixed contacts 36 and 37, the former of which is connected by leads 38 to the main lead 31. The movable element 39 of the circuit closer constitutes an extension from the rotatable barrel of the lock 27 so that after the key has been fully inserted in position to break circuit through the electromagnet 16 as hereinbefore described, a succeeding rotary movement of the key towards its unlocked position will close the circuit through the electromagnets 17—20. The energizing of these upper electromagnets will react on the plunger 14 to elevate the same into position to unlock the transmission and incidentally cause the movable element 22 of the ignition controlling circuit closer to move into engagement with the contact 23 and thus close the ignition circuit and permit the actuation of the engine.

In the more complicated form of the invention herein illustrated, the plunger lifting circuit constitutes a normally balanced split Wheatstone bridge with a part housed in and protected by the casing 26 and another part housed in and protected by the transmission casing 10. The circuit is split at the contact 37 into two legs one containing the resistances 42, 17 and 19 leading to the ground at 41. The other leg contains resistances 40, 18 and 20 similarly leading to ground 41. Between the resistances 40 in the control station and 17 in the transmission casing there is an exposed lead 43 and similarly between the resistances 42 and 20, there is an exposed lead 44. Similarly between the movable element 32 of the switch 29 and the electromagnet 16 there is an exposed lead 45. These leads together with the battery lead 31 are contained in a cable 46 connecting the transmission casing with the remote control station on the instrument board. In those cases where it is desired to dispose the ignition leads so that they may extend through the control station, such leads may also be enclosed in the cable 46.

It is within the scope of this disclosure to have the resistances 40 and 42 removable and replaceable so that resistances of other values may be substituted, it being of course understood that the resistances in each leg of the bridge should be balanced electrically.

The bridge is provided with a so-called galvanometer circuit which includes an electromagnet 47 with one end connected by lead 47ª to one of the equipotential parts of the bridge and the other end connected by lead 47ᵇ to the other equipotential point. The electromagnet 47 is operatively disposed when energized by the unbalancing of the bridge for any reason to act on a normally open armature 48 which together with the electromagnet constitutes in effect a relay for grounding the bridge as a whole and specifically for grounding either or both legs of the bridge. This is attained by a compound circuit closer of which the armature constitutes the movable element and is grounded as indicated in Fig. 4. One lead 49 provided with a low resistance 50 is connected to the resistance 17 and another lead 51 provided with low resistance 52 is connected to the resistance 20.

From this construction it is understood that a cutting or twisting together of any of the exposed wires in the cable will unbalance the bridge and cause current flow, even a weak current flow, to pass through the electromagnet 47 and which electromagnet in turn will ground leads 49 and 50 thus short circuiting the unlocking electromagnets 17—20. This condition will persist as long as the bridge is unbalanced and the circuit closed through the circuit closer 35.

From this construction it is appreciated that simply removing the key may or may not cause the transmission to be locked. While the failure of current will not lock the transmission, the presence of current will not alone lock the transmission. A reversal of current will not effect the status of the transmission. By providing an extension 53 from the upper end of the plunger 14 and extending the same through the top of the casing 10 and as is usual with some present forms of transmission locks, as suggested in dotted outline in Fig. 1, it is possible to depress the plunger and thus move it into locking position by manual or foot operation and this of course can be obtained in the absence of current to actuate the electromagnet 16. In the absence of such an exposed extension, it is possible to lock the transmission and thus open the ignition circuit by applying any source of electric energy, such as a storage battery, or dry cell to the battery lead 31. From this construction it is apparent that the transmission may be locked electrically without a key or its equivalent, but it can only be unlocked electrically and with the bridge balanced.

By means of the device disclosed it is not possible for an operator to turn off the engine until he has locked the transmission and removed the key. It is not possible to unlock the transmission and thus restore the ignition until the proper key has been inserted and subsequently rotated and even then the vehicle is not restored to normal running condition unless the bridge is balanced.

Having thus described our invention, we claim:

1. In a device of the class described, the combination of a transmission lock including an axially shiftable plunger provided on one side with a slot, a circuit closer having its movable element intruded into said slot, a spring pressed detent for restraining the plunger from movement out of its locking position, an electromagnet acting when energized to move the plunger into its locking position, four unlocking electromagnets coacting when energized to overcome the restraint of said detent and to move the plunger out of its locked position and to close said circuit closer, a normally balanced Wheatstone bridge, means in its galvanometer circuit for short-circuiting said unlocking electromagnets when the bridge is unbalanced, two of said unlocking electromagnets being formed of the parts of the bridge, one side of the connections therewith formed of the galvanometer circuit and the other two being formed of a part of the bridge legs on the other side of said connections, a remote control station containing replaceable resistances, leads connecting said resistances with the four unlocking electromagnets and coacting therewith to complete the Wheatstone bridge.

2. In a device of the class described, the combination of a transmission lock including an axially shiftable plunger provided on one side with a slot, a circuit closer having its movable element intruded into said slot, a spring pressed detent for restraining the plunger from movement out of its locking position, an electromagnet acting when energized to move the plunger into its locking position, four unlocking electromagnets coacting when energized to overcome the restraint of said detent and to move the plunger out of its locked position and to close said circuit closer, a normally balanced Wheatstone bridge, means in its galvanometer circuit for short-circuiting said unlocking electromagnets when the bridge is unbalanced, two of said unlocking electromagnets being formed of the parts of the bridge, one side of the connections therewith formed of the galvanometer circuit and the other two being formed of a part of the bridge legs on the other side of said connections.

3. In an automotive vehicle, the combination of a transmission lock provided with a plunger, means forming an electric circuit and including a circuit closer and an electromagnet for moving the plunger into position to lock the transmission, means forming a second circuit and including a second circuit closer and a second electromagnet for moving the plunger from said locking into an inoperative unlocking position, said second circuit including a normally balanced Wheatstone bridge, a relay contained in the galvanometer circuit of said bridge, a circuit closer controlled by the relay for grounding both legs of the bridge when the bridge is unbalanced, and means actuated by a single key for selectively actuating at will either of said circuit closers thereby to lock or unlock the transmission.

4. In an automotive vehicle, the combination of a transmission lock provided with a plunger, means forming an electric circuit and including a circuit closer and an electromagnet for moving the plunger into position to lock the transmission, means forming a second circuit and including a second circuit closer, and a second electromagnet for moving the plunger from said locking into an inoperative unlocking position, means actuated by a single key for selectively actuating at will either of said circuit closers thereby to lock or unlock the transmission, said second circuit including a normally balanced Wheatstone bridge, and means controlled by said bridge when electrically unbalanced for grounding and then automatically short-circuiting said second circuit.

5. In an automotive vehicle, the combination of a transmission lock including a movable element, means forming an electric circuit and including a circuit closer and an electromagnet for moving the said element into position to lock the transmission, means forming a second circuit and including a second circuit closer, and a second electromagnet for moving the element from said locking into an inoperative unlocking position, and means actuated by a single key and operatively dependent upon a rotary or a longitudinal movement of the key for selectively actuating at will either of said circuit closers thereby to lock or unlock the transmission.

6. In an automotive vehicle, the combination of a mechanical part of the driving mechanism of the vehicle, a lock for the same including a movable element, an ignition controlling circuit closer, means interconnecting said element and circuit closer for insuring a locking of the mechanical part before the ignition circuit is opened at the circuit closer and a control forming part of said means for causing in sequence the actuation of the lock element, and a circuit opening movement of the circuit closer thereby to prevent the shutting off of the ignition circuit of the vehicle unless and until there is a mechanical locking of the driving mechanism.

7. In a device of the class described, the combination of a transmission lock including a plunger element and elements forming an electric circuit and including an electromagnet for shifting the plunger element of said lock into locking position and a circuit closer for controlling the electric status of said electromagnet, resilient means tending to maintain said circuit closer in a normal condition intercepting current flow to the magnet, and a key actuated means acting against the resistance of said resilient means for shifting said circuit closer to change the normal electric status of said electromagnet to permit current flow to the magnet and thus move the plunger into locking position as an incident of inserting the controlling key into said key actuated means.

8. In a device of the class described, the combination of a locking plunger, electromagnetically actuated means for shifting said plunger, and a key actuated control for said means, said control including mechanism operably dependent on the removal of the controlling key for causing said means automatically to become operative.

9. In a device of the class described, the combination of a locking plunger, two sets of means, one for shifting the plunger in one direction and the other for shifting the plunger in the opposite direction, a control mechanism for both of said means, said mechanism including a key actuated lock, one of said means being controlled by the movement of the key into said lock and the other being controlled by the rotation of the key in the lock.

10. In a device of the class described, the combination of a locking plunger, two sets of electromagnetically actuated means, one for moving the plunger into locking position and the other for moving the same into unlocking position, a control mechanism for both of said sets, said mechanism including a key controlled lock, a circuit closer disposed in the path of movement of the key when inserted in the lock and actuated thereby for causing one of said means to become inoperative, and a second circuit closer controlled by a rotary movement of the key in the lock for causing the other means to become operative.

11. In a device of the class described, the combination of transmission lock including a plunger, a plunger projecting electromagnet for moving the plunger into operative position to lock the transmission, a plunger retractile electromagnet for withdrawing the plunger from its transmission locking position, a circuit closer for controlling said projecting electromagnet, a circuit closer for controlling the retractile electromagnet, a key controlled lock provided with a rotatable member constituting the movable element of the retractile electromagnet circuit closer, and means actuated by insertion of the lock key into the lock for moving the projecting magnet circuit closer into an open circuit position to render the projecting electromagnet inactive and thus permit the withdrawal of the plunger into an inoperative position when the rotation of the key closes the retractile circuit closer and causes the transmission lock plunger to be withdrawn from its operative locking position.

12. In a device of the class described, the combination of a transmission locking element, means tending normally to maintain the same in position to lock the transmission, a key-controlled lock and means disposed in the path of movement of the key when inserted in said lock and actuated thereby for rendering said element maintaining means inoperative and thus permit the movement of the transmission locking element into an inoperative position.

13. In a device of the class described, the combination of a transmission locking element, means tending normally to maintain the same in position to lock the transmission, a key-controlled lock and means disposed in the path of movement of the key when inserted in said lock and actuated thereby for rendering said means inoperative and thus permit the movement of the transmission locking element into an inoperative position, said means including mechanism automatically responsive to the withdrawal of the key from the lock for restoring said means to its operative condition to lock the transmission.

14. In a device of the class described, the combination of a transmission locking member, key-controlled electromagnetically actuated means for moving the same to and from its operative transmission locking position, and means operatively responsive to the withdrawal of the controlling key for causing the locking member to be moved into its operative position.

15. In a device of the class described, the combination of means forming an ignition circuit, including a circuit closer, electromagnetically actuated means for controlling said ignition circuit closer, a second manually controlled circuit closer for controlling said electromagnetically actuated means, a key controlled lock, and means disposed in the path of movement of the key when inserted in said lock and dependent upon the removal of the key from said lock for permitting said second circuit closer to function automatically as an incident of the manual withdrawal of the key.

16. In a device of the class described, the combination of elements acting to form an ignition circuit, electromagnetically actuated means for locking said circuit in an open circuit condition, a control for said means including a key controlled lock, and mechanism disposed in the path of movement of the key when inserted in said lock and actuated by said key when so inserted for causing said means to become inoperative as an incident of the manual insertion of the key in the lock, and said means including structural parts for causing said means to become operative and thereby lock said circuit automatically in its open circuit condition on the withdrawal of the key from the lock.

17. In a device of the class described, the combination of elements including a circuit closer forming an ignition circuit, a control for said circuit closer, a lock including a key controlled element having two rotative positions at which the key may be withdrawn manually and at will from the lock, means operably disposed when the key is in one of said positions to cause the control to open the circuit closer and when rotated into the other position to close the circuit closer as an incident of the manual rotation of the key into said other position.

18. In a device of the class described, the combination of a transmission lock, elements forming an ignition circuit and including a circuit closer, means forming an electric circuit and including an electromagnet for shifting the movable element of the lock into and from its locking position and means controlled by the movement of said movable lock element for changing the status of said ignition circuit closer whereby the opened or closed condition of the ignition circuit is a function of the locked or unlocked condition of the transmission lock and a circuit closer for said circuit remote from the transmission for controlling the lock and incidentally controlling the ignition circuit.

19. In a device of the class described, the combination of elements forming an ignition circuit and including a circuit closer, an electromagnetically actuated transmission lock having its movable element operatively connected to the movable element of the circuit closer whereby the movement of the transmission element into transmission locking position will automatically break the ignition circuit and means remote from the lock for controlling the same at a distance and thus controlling the ignition circuit from a station remote from the ignition circuit closer.

20. In a device of the class described, the combination of a transmission, a lock for the same including a locking plunger, a circuit closer having its movable element operatively connected to said plunger to move therewith and electromagnetically actuated means for shifting said plunger to and from its transmission locking position and incidentally to move the circuit closer to and from its circuit completing position.

21. In a device of the class described, the combination of two burglar resistant casings spaced apart, with an exposed unprotected cable extending therebetween, a locking plunger and electromagnetically actuated means for shifting the plunger contained in and protected by one of the casings, a circuit closer for controlling said means, a key controlled lock for governing said circuit closer, said lock and said circuit closer being contained in and protected by the other casing, the key slot of said lock being exposed for the insertion therein of the controlling key, and electric leads in said exposed cable electrically connecting said circuit closer in one of the casings with the electromagnetically actuated means in the other casing, and a balanced electric bridge having a part contained in said exposed cable for maintaining said electromagnetically actuated means functionally active and means controlled by the unbalancing of said bridge for rendering said means inoperative.

22. In a device of the class described, the combination of an ignition controlling circuit closer, means for moving the circuit closer into a locked circuit breaking position, electromagnetically actuated means for releasing said locked circuit closer and key controlled mechanism for manually controlling said last named means.

23. In a device of the class described, the combination of a transmission lock including a locking plunger, means including electromagnetically actuated elements for securing the same in its transmission locking position, and key actuated mechanism for causing said securing means to become inoperative.

24. In a device of the class described, the combination of a transmission lock including a locking plunger, means including electromagnetically actuated elements for securing the same in its transmission locking position, means for withdrawing said plunger from its transmission locking position, and key actuated mechanism for causing said securing means to become inoperative and to cause said withdrawing means to become operative.

25. In a device of the class described, the combination of a transmission lock including a plunger, means for moving the same into position to lock the transmission, an electromagnet operatively disposed when energized to move said plunger into an unlocked position, a key controlled lock, means controlled by the positioning of the key in the lock for causing said plunger moving means to become inoperative and means controlled by the rotation of the key in its associated lock for energizing said electromagnet.

26. In a device of the class described, the combination of a transmission lock including a plunger, an electric balance with certain of the legs thereof constituting an electromagnet operatively disposed when energized to move said plunger into an unlocked position, a grounding relay and a magnet for controlling the same included in the galvanometer circuit of said electric balance.

27. In a device of the class described, the combination of a transmission lock including a plunger, means for moving the same into position to lock the transmission, an electric balance bridge with certain of the legs thereof constituting an electromagnet operatively disposed when energized to move said plunger into an unlocked position, and means controlled by the unbalancing of the bridge for causing said unlocking electromagnet to become inoperative.

28. In a device of the class described, the combination of two burglar resistant casings spaced apart, with an exposed unprotected cable extending therebetween, a locking plunger and electromagnetically actuated means for shifting the plunger contained in and protected by one of the casings, a circuit closer for controlling said means, a key controlled lock for governing said circuit closer, said lock and said circuit closer being contained in and protected by the other casing, the key slot of said lock being exposed for the insertion therein of the controlling key, and electric leads in said exposed cable electrically connecting said circuit closer in one of the casings with the electromagnetically actuated means in the other casing.

29. In an automotive vehicle, the combination of a transmission lock including a shiftable plunger, an ignition controlling circuit closer having its movable element operatively controlled by and movable to and from its circuit closing position by said shiftable plunger, a locking electromagnet for moving the plunger into its transmission locking position and incidentally opening the ignition circuit, an electromagnet for moving the plunger into its inoperative unlocking position and incidentally closing the ignition circuit, said unlocking electromagnet constituting parts of two legs of a Wheatstone bridge, and a control station including a burglar resistant casing remote from the transmission lock and its associated electromagnets, and containing the remaining parts of said two legs of the Wheatstone bridge, means controlled by an unbalanced condition of said bridge for causing said unlocking electromagnet to become inoperative, and key controlled means for normally causing said electromagnets selectively to become energized and thus lock or unlock the transmission at will.

30. In a device of the class described, the combination of a transmission lock, including a plunger means for moving the same into and from its locking position, key controlled mechanisms for causing said means to function, selectively to lock and unlock the transmission, protective means for rendering the said locking means inoperative automatically, said protective means being operatively controlled by said mechanism and rendered inoperative by the pressure of the controlling key in said mechanism whereby to protect the transmission lock the key must be removed.

31. In a device of the class described, the combination comprising three units, a protected control unit, a protected local locking unit remote from the control unit and a connecting cable therebetween which is not necessarily protected, means forming an electric circuit including a key actuated circuit closer housed in the control unit, an electromagnetically actuated unlocking device housed in the locking unit and connecting conductors therebetween contained in the cable, and electric means contained partially in both of said protected units and including a Wheatstone bridge for short circuiting the current flow through said unlocking device thus rendering it inoperative and parts of said bridge being contained in said cable and adapted when brought into short circuiting contact to cause the bridge to function.

Signed at New York in the county of New York and State of New York this fifth day of November, A. D. 1926.

WALTER S. RUGG.
HOWARD J. MURRAY.